UNITED STATES PATENT OFFICE.

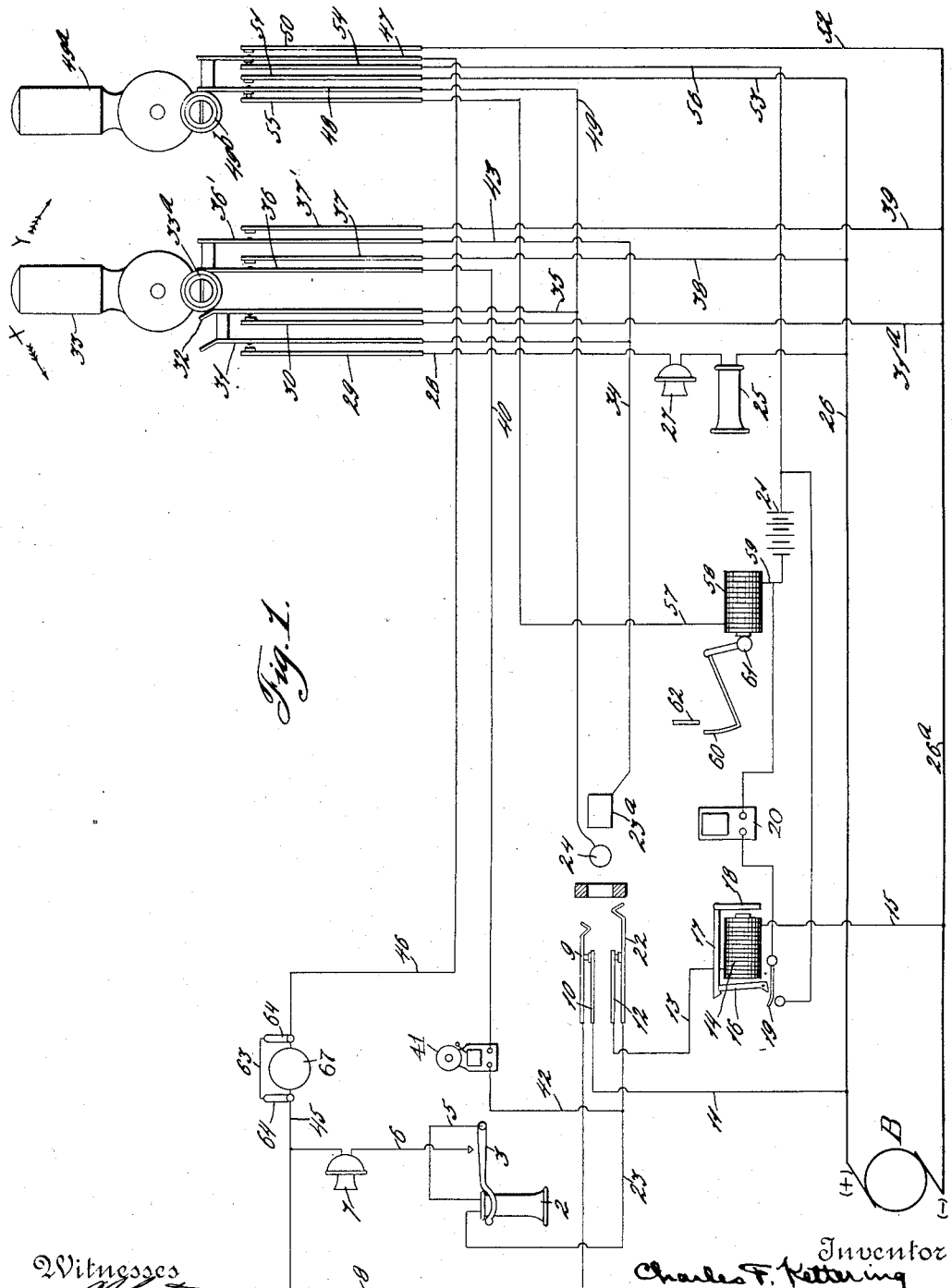

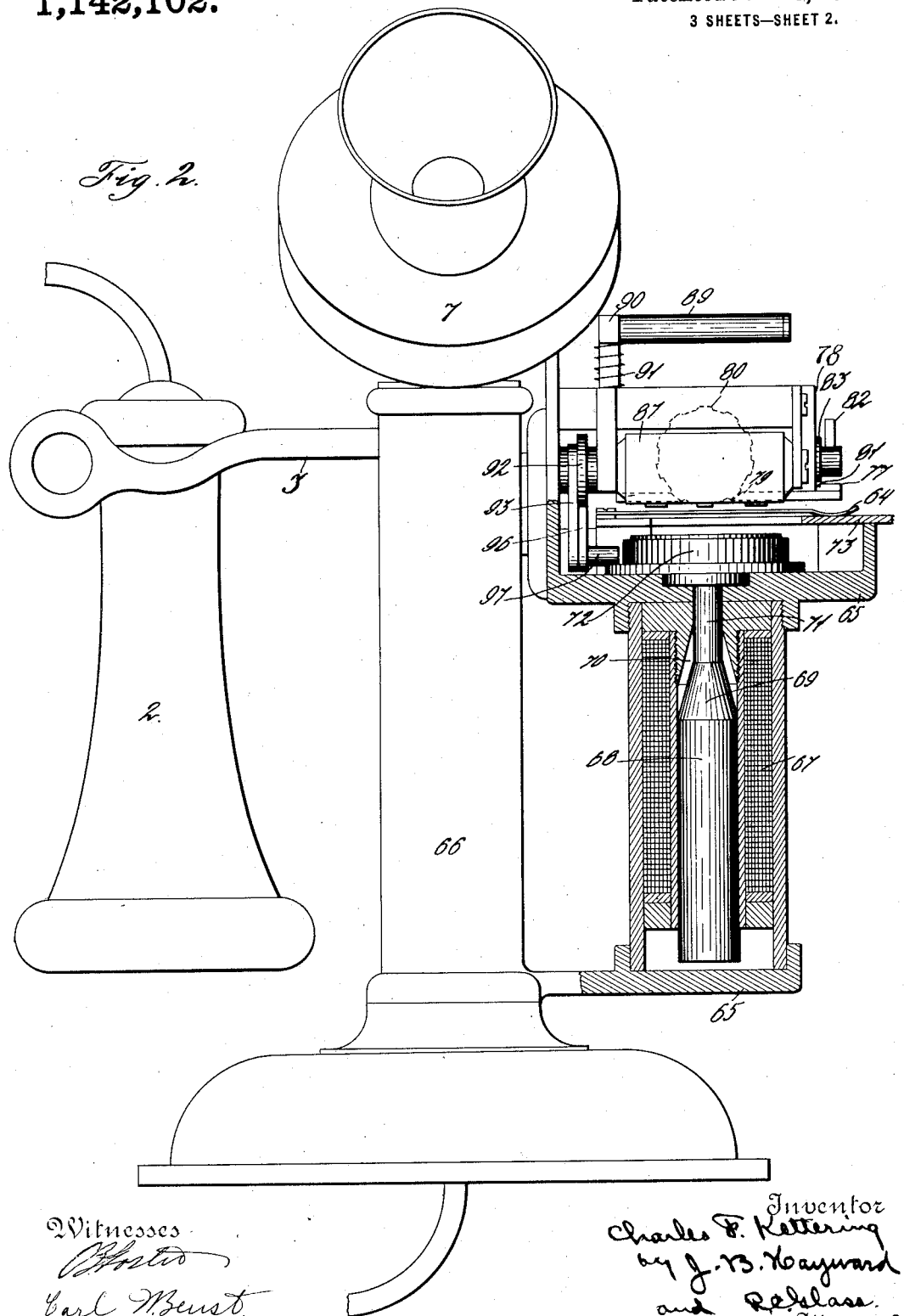

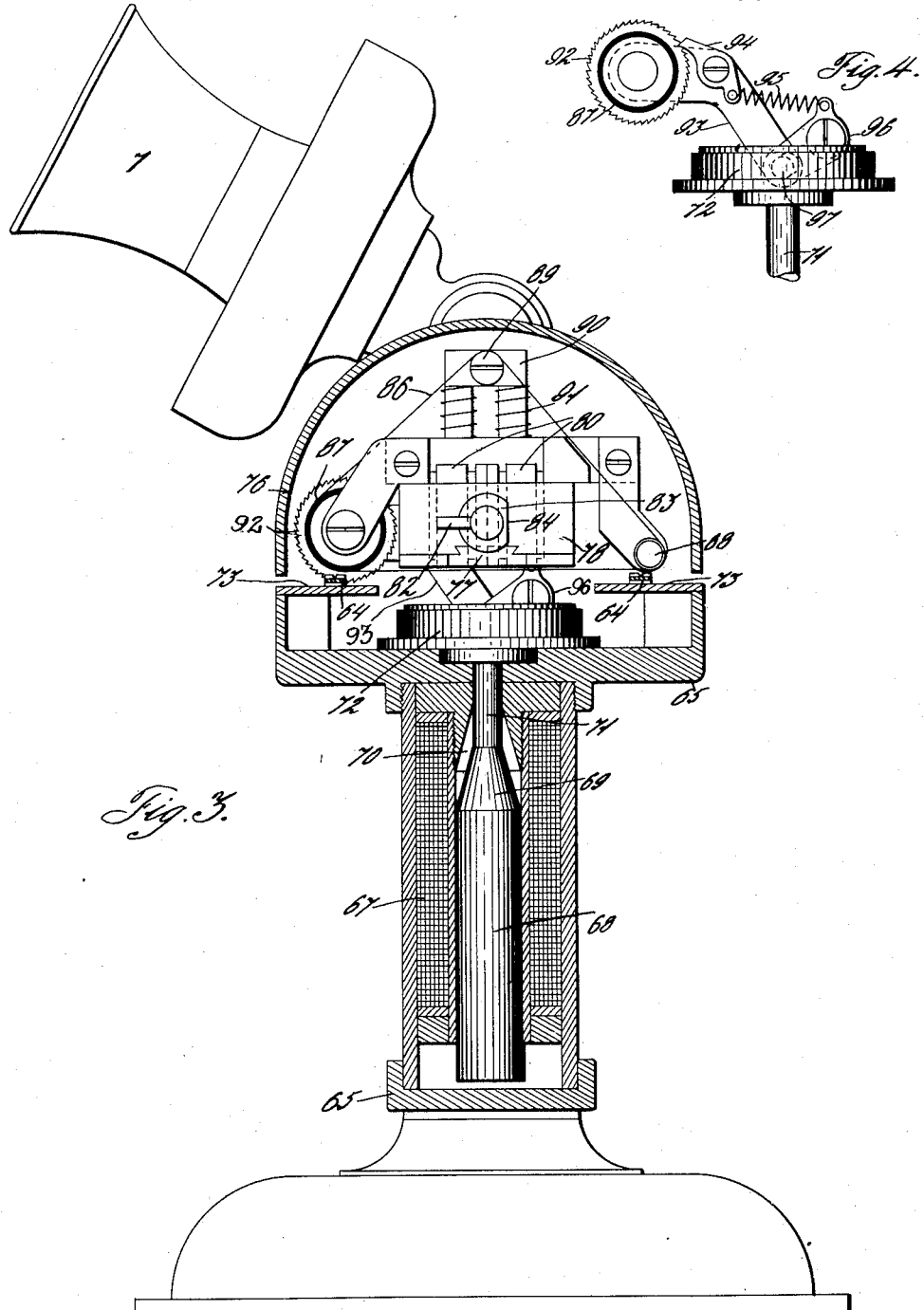

CHARLES F. KETTERING, OF DAYTON, OHIO, ASSIGNOR TO THE NATIONAL CASH REGISTER COMPANY, OF DAYTON, OHIO, A CORPORATION OF OHIO, (INCORPORATED IN 1906.)

STORE-SERVICE CREDIT-SYSTEM APPARATUS.

1,142,102.  Specification of Letters Patent.  Patented June 8, 1915.

Original application filed December 14, 1904, Serial No. 236,893. Divided and this application filed February 19, 1907. Serial No. 358,278.

*To all whom it may concern:*

Be it known that I, CHARLES F. KETTERING, a citizen of the United States, residing at Dayton, in the county of Montgomery and State of Ohio, have invented certain new and useful Improvements in Store-Service Credit-System Apparatus, of which I declare the following to be a full, clear, and exact description.
This invention relates to store service systems and has for its object to provide an improved stamping or printing device especially adapted for impressing any desired characters on a sales slip.
In many commercial establishments systems are used for passing goods to customers on credit, nearly all of which systems include the submission of a desired credit to some individual called a credit man who passes thereon. Any system requiring the sales slip to be taken to the credit man involves great loss of time and even if the telephone is used the salesperson is still not prevented from allowing credit on his or her own responsibility. A system has been devised in which a stamp at the salesperson's station is provided which can be operated by the credit man only and not by him if the sales slip or other article to be marked is not in the proper position.

In a prior application, Serial No. 236,893, filed December 14, 1904, issued November 15, 1910, as Patent No. 975,533, for store service systems a device of the kind has been shown and this present application is a division thereof. In the prior application the system including the stamp is claimed and the claims in this case will be limited to the stamping device and its connections.
The stamping device while especially adapted for the use stated may evidently be used as a stamping device solely and not as a part of such system as above outlined.

With these and incidental objects in view, the invention consists in certain novel features of construction and combination of parts, the essential elements of which are set forth in appended claims and a preferred form of embodiment of which is hereinafter described with reference to the drawings which accompany and form part of this specification.

Of said drawings: Figure 1 is a diagram of the system showing the electrical connections employed. Fig. 2 is a side view of the mechanism at the clerk's station including a telephone set and the stamping device, the telephone being in elevation and the stamp in section. Fig. 3 is a view at right angles from Fig. 2 showing the stamping device in section. Fig. 4 is a detail showing the mechanism for feeding the inking ribbon of the stamp.

The stamping device is shown herein as attached to the standard of the usual desk telephone but it is to be understood that this attachment is a mere matter of convenience and the stamp may if desired be an integral structure.

Referring to Fig. 2 it will be seen that the standard 66 of the telephone supports frames 65 for the stamp. The stamp is electrically operated by a solenoid coil 67 serving to reciprocate core 68 which has a conical portion 69 connecting the core to a plunger 71 which is itself attached to a printing head 72. The sales slip or other article to be marked is inserted over plate 73 which is integral with or connected to the upper frame piece 65. In the mechanism shown a sliding plate 77 is provided dove-tailed into a supporting piece 78 and bearing on its under side any desired printing type, such for example as a number indicating the particular station and the word "Charge." The plate 73, above referred to, is cut away to allow the printing head 72 to rise therethrough to strike and thereby take an impression from a set of the date wheels 80 and the type plate 77. To maintain the plate 77 in proper printing position the notch 81 is provided therein adapted to be engaged by a disk 83 having a cut away portion 84 and which is moved through a projecting arm 82. It will be clear that in the position shown in Fig. 2 the plate 77 may be withdrawn as the cut away portion 84 of disk 83 is directly thereover, but when the disk 83 is given a quarter turn through the operation of projection 82 the disk assumes the position of Fig. 3 and plate 77 is then locked in printing position.

An inking ribbon 86 is provided passing around an ink roller 87, a supporting roller 88 and a tensioning roller 89. The roller 89 is carried by a standard 90 supported from the frame of the stamp and springs 91 tend to elevate the standard 90 and consequently tension the ribbon 86. To feed the ribbon a ratchet 92 is provided connected to the inking roller 87 and journaled on the supporting shaft therefor is the arm 93 carrying a pawl 94 normally drawn by a spring 95 connecting the lower end of the pawl to a projection of a pivoted arm 96 which has a slot and pin connection with a pin 97 on the arm 93. The pin 97 as shown in Figs. 2 and 4 is directly over a flange on the plunger head 72 so that when the plunger rises the pin 97 will be forced upwardly through the slot in arm 96 thereby feeding the inking ribbon through the agency of pawl 94. This serves to furnish a fresh part of the ribbon at the printing point for each operation of the stamp.

A pair of springs 64 serve a double purpose, namely, to retain the sales slip on the plate 73 and to form a shunt with said plate around the solenoid 67. It has been stated that the stamp could not be operated even by the credit man in the absence of an article to be marked and this function is provided for by the springs 64. The springs are normally in the position shown in Fig. 2 and are electrically connected through the plate 73 and the upper frame piece 65. These parts comprising a shunt to the solenoid are of very low resistance so that if no paper is inserted nearly all the current will pass through the shunt and not enough will pass through the solenoid 67 to operate the core 68. If however a sales slip or article to be marked is inserted between springs 64 and plate 73 the shunt is thereby broken and all the current will pass through the solenoid 67 thereby elevating the core 68, and springs 64 at this time perform their other function of retaining the slip in the proper position.

The electrical connections of the device may now be described referring to the diagram, Fig. 1. A telephone set is provided at the clerk's station and a corresponding set at the station of the credit man together with the usual annunciator drop and signal and an indicator for showing to the credit man whether the paper has been inserted in the stamp. When the clerk desires authorization of a credit sale the receiver 2 is raised from the hook 3 in the usual way and a circuit through the annunciator is closed as follows: from the generator B, line wire 26, wire 11, contact 10, contact 9, wire 8, transmitter 7, wire 6, hook 3, wire 5, receiver 2, wire 23, contact 22, contact 12, wire 13, annunciator magnet 14, wire 15, and line 26ᵃ to the generator. It will be noted that merely withdrawing the receiver from the hook serves to close the annunciator circuit and magnet 14 will be energized attracting its armature 18 and allowing the drop 16 to move from the position in which it is normally held by arm 17. When the drop 16 moves spring 19 will close a local buzzer circuit including battery 21 and buzzer 20. This buzzer circuit is obvious. The attention of the credit man having been invited by the buzzer 20 he inserts the plug comprising contacts 23ᵃ and 24 into the line jack separating contacts 9 and 10 and 22 and 12. When switch 33 is thrown in the direction of the arrow Y the insulated roller 33ᵃ closes two pairs of contacts and a talking circuit is then formed as follows; it being remembered that plug contact 24 is now in contact with spring 9 and that plug contact 23ᵃ is in contact with spring 22, also that contacts 9 and 10 and 22 and 12 have been separated: generator, positive line 26, receiver 25, transmitter 27, wire 28, contact 29, contact 31, wire 34, plug contact, 23ᵃ, spring contact 22, wire 23, receiver 2, wire 5, hook 3, wire 6, transmitter 7, wire 8, spring contact 9, plug contact 24, wire 35, contact 32, contact 30, line 26ᵃ, back to the generator. If the credit man desires to call the clerk's attention the switch 33 may be turned in the direction of arrow X and insulating roller 33ᵃ will connect two additional pairs of contacts serving to close a signal circuit. For example if the credit man desires to communicate with the clerk the switch may be moved once, whereas if no paper has been inserted in the stamp and he desires to call attention to this the switch may be moved twice. The signal circuit is as follows: generator, positive line 26, wire 38, contact 37, contact 36, wire 40, single stroke bell 41, wire 42, spring contact 22, plug contact 23ᵃ, wire 34, wire 43, contact 36', contact 37', wire 39, negative line 26ᵃ back to the generator. It will be clear that this circuit will be closed each time switch 33 is moved in the direction of arrow X.

It may be presumed that the preceding operations have been carried out and that the credit man is ready to authorize the credit asked for. It is therefore desirable that he should be able to tell whether an article to be marked has been inserted in the stamp, and for this purpose an indicator 62 is provided bearing the words "No paper" or the equivalent and a shield 60 is also provided having a ball or part 61 serving as an armature for magnet 58 and tending normally to elevate the shield 60 over the plate 62. A second switch 49ᵃ is provided having an insulated roller 49ᵇ which is adapted when the switch is moved to break one pair of contacts which are normally made and to move one member of each pair into contact with additional contact springs. When the switch 49ᵃ is in the position shown, an indicating circuit is made as follows: battery 21, wire 56, contact 54, contact 47, wire 46, solenoid 67, wire 8, spring contact 9, plug contact 24, wire 49, contact 48, contact 55, wire 57, magnet 58, and wire 59 back to the battery 21. It will be seen that this circuit includes the solenoid 67 and the shunt thereto including springs 64. When the shunt is closed enough current will pass to maintain the armature 61 close to magnet 58 and thereby expose the indicator 62. If however a paper is inserted in the stamp the additional resistance of the solenoid core is thrown into this circuit and not enough current will then pass to retain armature 61 which through gravity or a spring moves away from the magnet 58 and covers shield 62. The credit man can therefore tell whether a paper has been inserted in the stamp or not. Assuming that the indicator shows that an article to be marked has been inserted in the stamp, the switch 49ª is thrown making an additional circuit and breaking the indicator circuit. The stamping circuit then made is as follows: from the generator, main line 26, wire 53, contact 51, contact 48, wire 49, plug contact 24, spring contact 9, wire 8, wire 45, solenoid 67, wire 46, contact 47, contact 50, wire 52, and line 26ª back to the generator. This circuit will energize the solenoid 67 and cause an impression to be made on the paper. It may furthermore be noted that even if the plug has not been inserted in the jack the stamping circuit may nevertheless be made if desired, this circuit includes; generator, line wire 26, wire 11, contact 10, contact 9, wire 8, wire 45, solenoid 67, wire 46, contact 47, contact 50, wire 52, and line 26ª back to the generator.

The stamp has been described as part of the system but it will be evident that it may be efficiently used as a stamping device by itself and it is desired to so claim it.

While the form of mechanism here shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows:

1. In a system of the character described, a marking device; distant means for controlling said device; and means whereby said marking device is rendered unresponsive to the controlling means in the absence of an article to be marked.

2. In a system of the character described, an electrically operable marking device; distant means for controlling said device; and means whereby said marking device is rendered unresponsive to the controlling means in the absence of an article to be marked.

3. In a system of the character described, an electrically operable marking device; distant means for controlling said device; and means including a shunt circuit whereby the marking device is rendered unresponsive to the controlling means in the absence of the article to be marked.

4. In a system of the character described, a stamping device; distant means for controlling said device; and means whereby said stamping device is rendered unresponsive to the controlling means in the absence of an article to be stamped.

5. In a system of the character described, a marking device; independently operable means at a distant station for controlling said device; and means whereby the marking device is rendered unresponsive to the independently operable means in the absence of the article to be marked.

6. In a system of the character described, the combination of a marking device; means normally rendering the device inoperative but adapted to be rendered ineffective for this purpose by the insertion of an article into position for being marked; and means for operating the marking device.

7. In a system of the character described, the combination of a marking device; means normally rendering the device inoperative but adapted to be rendered ineffective for this purpose by the presence of an article in position for being marked; and means for operating the marking device.

8. In a system of the character described, an electrically operated stamping device including a magnet; a shunt around the magnet; and a contact in the shunt circuit arranged to be broken by the insertion of an article to be stamped.

9. In a system of the character described, the combination of a rest or platform to receive a slip of paper; resilient fingers bearing upon said platform and arranged to hold the paper slip in place thereon; type carriers above the platform; a magnetic stamp working through the platform; and a shunt circuit around the magnet through the platform and resilient fingers.

10. In a system of the character described, a marking device; means at a distant station for controlling said device; and a signal for the operator at said distant station automatically controlled by and indicating the presence or absence of an article to be marked.

11. In a system of the character described, a marking device; means at a distant station for controlling said device; and a signal for the operator at said distant station automatically controlled electrically by and indicating the presence or absence of an article to be marked.

12. In a system of the character described, a marking device; means for rendering it inoperative in the absence of an article to be marked; means at a distant station for controlling the marking device; and a signal indicating at the distant station the presence or absence of an article to be marked.

13. In a system of the character described, a stamping device having means for rendering it inoperative in the absence of the article to be marked; means at a distant station for controlling the stamping device; and a signal indicating at the distant station the presence or absence of an article to be stamped.

14. In a system of the character described, an electrically operable stamping device; means for rendering it inoperative in the absence of the article to be stamped; means at a distant station for controlling the stamping device; and a signal indicating at the distant station the presence or absence of an article to be stamped.

15. In a system of the character described, an electrically operable marking device having means including a shunt circuit for rendering it inoperative in the absence of the article to be marked; means at a distant station for controlling the operation of the marking device; and a signal distant from the marking device for indicating at the distant station the presence or absence of the article to be marked, said signal being in a circuit including the shunt.

16. In a system of the character described, the combination of an electrically operable marking device including a magnet and a plunger; a shunt around the magnet; a contact in the shunt circuit arranged to be broken by the insertion of the article to be marked; means at a distant station for controlling the operation of the marking device; and a signal for indicating at the distant station the presence or absence of the article to be marked, said signal being in a circuit including the shunt.

17. In a system of the character described, the combination with a rest or platform to receive a slip of paper; resilient fingers bearing upon said platform and arranged to hold the slip of paper in place thereon; type carriers above the platform; a magnet and a stamp operated thereby; a shunt circuit around the magnet through the platform and resilient fingers; and a distant signal indicating the presence or absence of the article to be marked, said signal being in a circuit including the shunt.

18. In a system of the character described, the combination with a receiving station; of a sending station; a marking device at the receiving station; controlling means at the other station for controlling the operation of the marking device; and a signal distant from the receiving station for indicating at the sending station the presence or absence of an article to be marked.

19. In a system of the character described, the combination with a receiving station; of a sending station; a marking device at the receiving station; means at the other station for controlling the operation of the marking device; and a signal controlled electrically for indicating at the sending station the presence or absence of an article to be marked.

20. In a system of the character described, the combination of a receiving station; a sending station; a marking device located at the receiving station; means at the receiving station for controlling the operativeness of the marking device; means at the sending station for controlling the operation of the marking device and means for indicating at the sending station the operative condition of the marking device.

21. In a system of the character described, the combination of a receiving station; a sending station; a marking device at the receiving station; means located at the other station for controlling the operation of said marking device; means whereby the marking device is rendered unresponsive to the controlling means in the absence of an article to be marked; and means adjacent said controlling means for indicating whether or not the marking device will be responsive to the controlling means.

22. In a system of the character described, the combination of a receiving station; a sending station; a marking device located at the receiving station; means at the other station for controlling the marking device; means for controlling the responsiveness of the marking device to the controlling device; and means at the sending station for indicating whether or not the marking device would be responsive to the controlling means if the latter were actuated.

23. In a system of the character described, the combination of a receiving station; a sending station; a marking device located at the receiving station; means located at the other station for controlling the marking device; and means at sending station for determining whether an actuation of the controlling means will cause an operation of the marking device.

24. In a system of the character described, the combination of a receiving station; a sending station; a marking device located at the receiving station; means at the sending station for controlling the operation of the marking device; means for determining whether an actuation of the controlling means shall be effective to produce an operation of the marking device; and means for indicating to an operator at the sending station the condition of said determining means.

25. In a system of the character described, the combination with a receiving station, of a sending station; a marking device located at the receiving station; means at the sending station for controlling the operation of said marking device; means at the receiving station for determining whether an actuation of said controlling means will be effective to produce an operation of said marking device; and means for indicating at the sending station the condition of said determining means.

26. In a system of the character described, the combination with an electrical stamp device including a magnet and an electric circuit for operating the same; of a shunt in said circuit and around the magnet for varying the electrical condition of said stamp device by the absence or presence of the article to be stamped thereby rendering it operative or inoperative.

27. In a system of the character described, the combination of an electrical stamp device including a magnet; an electric circuit for operating the same; distant means for controlling said circuit; and a shunt in the circuit and around the magnet for varying the electrical condition of such stamp device, thereby rendering it operative or inoperative.

28. In a system of the character described, the combination of an electrical stamp device including a magnet and an electric circuit for operating the same; a shunt in said circuit and around the magnet for varying the electrical resistance of said stamp device by the absence or presence of the article to be stamped to thereby render the same operative or inoperative.

29. In a system of the character described, the combination of an electrically operable stamping device; an electric circuit for operating the same; and means controlled by the paper to be stamped for varying the electrical resistance of said stamping device and thereby rendering the same operative or inoperative according to the presence or absence of the paper.

30. In a system of the character described, the combination with an electrically operable marking device; an electric circuit for operating the same; a distant signal electrically connected to said marking device; and means for varying the electrical condition of said marking device and thereby controlling said signal.

31. In a system of the character described, the combination with an electrically operable marking device; an electric circuit for operating the same; a distant signal electrically connected with said marking device; and means controlled by the paper to be marked for varying the electrical resistance of said marking device and thereby causing said signal to indicate the presence or absence of the paper to be marked.

32. In a system of the character described, the combination of a marking device; distant means for controlling the operation of the same; a distant signal electrically connected with the marking device and indicating at the distant means; and means for varying the electrical condition of said marking device and thereby controlling the signal.

In testimony whereof I affix my signature in the presence of two witnesses.

CHARLES F. KETTERING.

Witnesses:
   Roy C. Glass,
   Carl J. Benst.